United States Patent

Hofmeister

[15] 3,661,516

[45] May 9, 1972

[54] METHOD OF PREPARING AMMONIUM AMIDO-SULFONATE

[72] Inventor: Heinz-Karl Hofmeister, Kelkheim/Taunus, Germany

[73] Assignee: Farbwerke Hoechst Aktiengesellschaft vormals Meister Lucius & Bruning, Frankfurt/Main, Germany

[22] Filed: Mar. 17, 1970

[21] Appl. No.: 20,386

[30] Foreign Application Priority Data

Mar. 27, 1969 Germany.....................P 19 15 723.4

[52] U.S. Cl. ............................................................23/114
[51] Int. Cl. ......................................................C01b 17/00
[58] Field of Search............................................23/114, 166

[56] References Cited

UNITED STATES PATENTS 3,404,949  10/1968  Ito ...........................................23/114

FOREIGN PATENTS OR APPLICATIONS 647,316  12/1950  Great Britain...........................23/114
741,729  12/1955  Great Britain...........................23/114

Primary Examiner—Earl C. Thomas
Attorney—Curtis, Morris & Safford

[57] ABSTRACT

Amido-sulfonic acid and its salts are prepared by direct reaction of sulfuric anhydride with ammonia. The reaction is effected in such a way that a molten reaction product is obtained. By means of this process the reaction heat can be utilized and at the same time high space-time yields are obtained.

4 Claims, No Drawings

METHOD OF PREPARING AMMONIUM AMIDO-SULFONATE

The present invention relates to a process for the preparation of amido-sulfonic acid and its salts from sulfuric anhydride and ammonia.

Amido-sulfonic acid serves, for example in detergents, for removing lime deposits. Ammonium amido-sulfonate is used as a herbicide.

It is known to prepare ammonium amido-sulfonate by reacting sulfuric anhydride with ammonia. In the course of this process ammonium amido-sulfonate and the ammonium salts of imido-disulfonic acid and of nitrilo-trisulfonic acid, as well as ammonium sulfate, are obtained. The reaction of sulfuric anhydride with ammonia is very exothermic. In carrying out this reaction very high temperatures must be avoided in order to prevent a reduction of the sulfuric anhydride to sulfur and an oxidation of the ammonia to nitrogen, and also to keep the formation of ammonium imido-disulfonate and of ammonium sulfate in the reaction mixture at a minimum. Attempts have been made, therefore, to effect the reaction under cooling. German Pat. No. 903,571 describes a method according to which the reaction is carried out in the gaseous phase in order to obtain a solid, finely crystallized reaction mixture. This light and dry powder can then be discharged from the reaction chamber, for example by means of screw conveyors. It is necessary, however, to carefully control the temperature, since temperatures that are too high result in an agglomeration or the reaction product sticks together. Temperature control in the reaction chambers is difficult, since considerable differences in temperature may occur. A small deviation of the desired temperature, however, may result in an interruption of operations for some time. As large reaction chambers have to be used, this gas phase reaction give only very low space-time yields, owing to the fact that the chamber walls permit only a poor heat transfer.

U.S. Pat. No. 3,404,949 describes the preparation of ammonium amido-sulfonate by treating molten ammonium imido-disulfonate or ammonium nitrilo-trisulfonate with ammonia under pressure. Moreover, U.S. Pat. No. 3,404,950 describes a process for the preparation of ammonium amido-sulfonate from sulfuric anhydride and ammonia by way of the formation of ammonium imido-disulfonate. In the course of this process the ammonium imido-disulfonate, which has to be prepared first, is suspended in an inert solvent and is then converted into ammonium amido-sulfonate under a high ammonia pressure. These two processes have the drawback that ammonium imido-disulfonate or ammonium nitrilo-trisulfonate have to be prepared first which must subsequently be converted into ammonium amido-sulfonate by means of a complicated technical process, for example under pressure.

It has now been found that amido-sulfonic acid or its salts can be prepared easily and with a high space-time yield, by reacting sulfuric anhydride with ammonia and, optionally, hydrolyzing the reaction mixture obtained, if the reaction of the sulfuric anhydride with ammonia is carried out in the presence of an amount of ammonia in excess of the stoichiometric amount necessary for the formation of ammonium amido-sulfonate, and at a temperature at which the reaction mixture is obtained in the molten state.

The excess of ammonia should advantageously be at least twice as high as the amount that is stoichiometrically necessary. The preferred range of the ammonia excess is from twice to four times as much as the stoichiometrical amount.

The eutectic mixture of ammonium amido-sulfonate and ammonium imido-disulfonate melts at a temperature of about 120° C. The melting point depends on the respective proportions of ammonium nitrilo-trisulfonate or ammonium sulfate. The reaction should therefore be carried out at temperatures above this melting point, i.e., at temperatures above 120° C. For continuous reaction between sulfuric anhydride and ammonia to the desired ammonium amido-sulfonate, a temperature in the range of from 160° to 300° C. approximately has proven to be advantageous. If temperatures rise above 350° C., an intensified formation of sulfur and nitrogen is observed. With temperatures far above 350° C., some decomposition of the sulfuric anhydride and ammonia used, as well as an increased formation of sulfate, have to be taken into account.

The temperature range specified above permits the utilization of the heat, which is set free in the course of the process, for the generation of steam, if suitable corrosion-resistant heat exchangers are placed into the reaction vessel. The molten reaction product transfers the heat of reaction onto the exchangers, thus preventing a local overheating.

The reaction of sulfuric anhydride with ammonia is preferably carried out at an overall pressure of from one to 30 atmospheres, preferably at a pressure of from 1.5 to 15 atmospheres.

If pure sulfuric anhydride is reacted with an excess of pure ammonia, the total amount of sulfuric anhydride is used up. As a result the pressure in the reaction vessel becomes equal to the partial pressure of the ammonia.

The sulfuric anhydride can also originate from roast gases. In this case it contains a greater proportion of inert gases (nitrogen). If this sulfuric anhydride originating from roast gases is reacted with ammonia, the overall pressure in the reaction vessel is the sum of the partial pressure of the ammonia and the partial pressure of the inert gas, i.e., the partial pressure of the ammonia decreases accordingly. However, in order to ensure a sufficiently high yield of ammonium amido-sulfonate, the partial pressure of ammonia should not fall below 0.5 atmosphere.

The reaction can be effected by bringing together ammonia and sulfuric anhydride in the gaseous phase. It is preferred, however, to introduce the ammonia and the sulfuric anhydride through inlet tubes directly into the liquid molten reaction mixture which is in the lower part of the reaction vessel. The introduction can also be effected by introducing the sulfuric anhydride into the gaseous phase, while ammonia is introduced into the melt. Ammonia and sulfuric anhydride can also be introduced as liquids.

The excess ammonia which collects in the reaction vessel can be removed by means of pumps and can then again be used for the reaction; the ammonia is then advantageously circulated by means of a blower.

The gases or liquids introduced should be anhydrous, if possible, since any water content, free or combined, results in the formation of undesired ammonium sulfate.

The molten reaction mixture which is formed in the process consists of the desired ammonium amido-sulfonate, ammonium imido-disulfonate and of ammonium nitrilo-trisulfonate and ammonium sulfate. It is discharged from the reaction vessel as a liquid. If this mixture contains a sufficiently high ammonium amido-sulfonate proportion, it can be directly used after cooling, for example as a herbicide, without any further treatment. In most cases, however, the reaction mixture is hydrolyzed. To effect this hydrolysis, the hot reaction mixture is reacted with water, whereby ammonium amido-sulfonate, amido-sulfonic acid and ammonium sulfate are formed from the ammonium imido-disulfonate and the ammonium nitrilo-sulfonate. The hydrolysis can be accelerated by the addition of strong acids, such as nitric acid, sulfuric acid or hydrochloric acid. In the course of hydrolysis, the crystallization of amido-sulfonic acid occurs. By the addition of the respective metal oxides, carbonates or hydroxides it is possible to prepare the desired salts of amido-sulfonic acid.

The reaction of sulfuric anhydride with ammonia in accordance with the invention has therefore the advantage that the reaction to ammonium amido-sulfonate can be carried out in a single reaction vessel and in one stage.

The following Table shows that the process in accordance with the invention not only results in far higher space-time yields, but also allows the utilization of the heat generated by the exothermic reaction for the generation of steam.

Space-time yield (kg/m³·h)

| Process | of reaction mixture | of steam |
|---|---|---|
| according to the prior art | maximum 8–10 | 0** |
| according to the invention | approx. 300–1000 | 300–1400 |

**on the contrary: great need of cooling water!

EXAMPLE 1

66 g of sulfuric anhydride and 50 g of ammonia were introduced per hour into a reaction vessel, which consists of a glass tube having a diameter of 2 cm and a length of 30 cm. The reaction vessel was provided, in its upper part, with inlet pipes for ammonia and sulfuric anhydride. In its lower part there was a funnel-shaped insert. Below this insert the molten reaction mixture obtained and the excess ammonia were drawn off.

The glass tube was surrounded by a cooling jacket serving as heat exchanger.

The reaction of sulfuric anhydride with ammonia yielded about 90 g of a molten reaction mixture per hour. The space-time yield was 0.95 g/cm$^3$.h corresponding to approximately 950 kg/m$^3$.h. The reaction mixture consisted of 59.3 percent of ammonium imido-disulfonate, 31.4 percent of ammonium amido-sulfonate, and 9.3 percent of ammonium sulfate. The temperature in the molten phase was in the range of from about 260° to 270° C. In the gaseous phase next to the inlet pipes the temperature was about 300° C. Occasionally the temperature rose up to about 350° C., in which case minor precipitations of sulfur were observed, as well as an increased formation of ammonium sulfate as a consequence thereof.

A minor content of ammonium sulfate was observed in all experiments performed, as the sulfuric anhydride used had been prepared from oleum whereby sulfuric acid was introduced.

The reaction mixture was hydrolyzed with water and converted into 55 g of amido-sulfonic acid with nitric acid of 60 percent strength; this corresponded to a yield of about 68.7 percent of amido-sulfonic acid, calculated on the sulfuric anhydride used.

EXAMPLE 2

In accordance with Example 1, 57 g of pure sulfuric anhydride and 50 g of pure ammonia were introduced per hour into a reaction vessel made of titanium under a pressure of about 10 atmospheres. The temperature in the gaseous phase was in the range of from 280° to 300° C. In the liquid reaction mixture the temperature was at about 210° C. Per hour, approximately 80 g of a reaction mixture were obtained, which had the following composition: 78 percent of ammonium amido-sulfonate, 18 percent of ammonium imido-disulfonate, 4 percent of ammonium sulfate. The space-time yield was 0.85 g/cm$^3$.h corresponding to approximately 850 kg of reaction mixture/m$^3$.h. From those 80 g of reaction mixture, 56 g of amido-sulfonic acid were obtained corresponding to a yield of 81 percent of amido-sulfonic acid, calculated on the sulfuric anhydride used.

EXAMPLE 3

A reaction vessel made of titanium and having a volume of about 500 cm$^3$ was maintained at a temperature of about 300° C. by means of built-in heat exchangers. 134 g of sulfuric anhydride and 120 g of ammonia were introduced per hour directly into the melt. The excess ammonia was drawn off in the upper part of the reaction vessel.

180 g of reaction mixture were obtained per hour, which consisted of 89.4 percent of ammonium imido-disulfonate, 4.9 percent of ammonium amido-sulfonate, and 5.7 percent of ammonium sulfate. The space-time yield of reaction mixture was 0.36 g/cm$^3$.h corresponding to about 360 kg/m$^3$h.

The heat exchangers served for steam production; about 1.4 kg of steam with a temperature of between 200° and 250° C. could be obtained per kg of reaction mixture formed.

The liquid reaction mixture drawn off the lower part of the reaction vessel flowed into hydrolyzing vessels where it was converted into ammonium amido-sulfonate by means of water, at temperatures in the range of from about 30° to 70° C. By acidification of these ammonium amido-sulfonate solutions with nitric acid of 60 percent strength, amido-sulfonic acid was formed. The mixture was cooled, and at a temperature of 25° C., about 107 g of amido-sulfonic acid separated per hour in the form of crystals, corresponding to a yield of 66 percent of amido-sulfonic acid, calculated on the sulfuric anhydride used.

We claim:

1. In a process for the preparation of ammonium amido-sulfonate by the reaction of sulfuric anhydride with ammonia, the improvement which comprises introducing ammonia and sulfuric anhydride directly into the molten reaction mixture containing ammonium amido-sulfonate.

2. A process in accordance with claim 1, wherein a temperature of between 120° and 350° C., preferably between 160° and 300° C., is adjusted in the reaction vessel.

3. A process in accordance with claim 1, which comprises carrying out the reaction under a pressure of between one and 30 atmospheres, preferably between 1.5 and 15 atmospheres.

4. A process in accordance with claim 1, which comprises maintaining the reaction temperature by means of a heat exchanger placed into the molten reaction mixture.

* * * * *